(12) United States Patent
Dering et al.

(10) Patent No.: US 9,360,744 B2
(45) Date of Patent: Jun. 7, 2016

(54) CAMERA TRIPOD

(71) Applicant: Peak Design, LLC, San Francisco, CA (US)

(72) Inventors: Peter Dering, San Francisco, CA (US); Art Viger, San Francisco, CA (US)

(73) Assignee: Peak Design, LLC, San Francisco, CA (US)

( * ) Notice: Subject to any disclaimer, the term of this patent is extended or adjusted under 35 U.S.C. 154(b) by 0 days.

(21) Appl. No.: 14/726,161

(22) Filed: May 29, 2015

(65) Prior Publication Data

US 2015/0346589 A1 Dec. 3, 2015

Related U.S. Application Data (60) Provisional application No. 62/005,344, filed on May 30, 2014.

(51) Int. Cl.
*G03B 17/00* (2006.01)
*G03B 17/56* (2006.01)

(52) U.S. Cl.
CPC .................................. *G03B 17/561* (2013.01)

(58) Field of Classification Search
USPC ........................................................ 396/428
See application file for complete search history.

(56) References Cited

U.S. PATENT DOCUMENTS

| | | | | | |
|---|---|---|---|---|---|
| 2,323,473 | A * | 7/1943 | Korling | .................. | F16M 11/10 248/183.1 |
| 2,794,612 | A * | 6/1957 | Clifton | .................. | F16M 11/28 108/1 |
| 4,174,900 | A * | 11/1979 | Ina | .................. | F16M 11/32 248/163.1 |
| 4,767,090 | A * | 8/1988 | Hartman | ................. | F16M 11/16 24/273 |
| 5,341,185 | A * | 8/1994 | Nakatani | ................. | F16M 11/28 248/169 |
| 8,942,550 | B1 * | 1/2015 | Carter | ................... | F24H 3/0423 248/168 |
| 2001/0010764 | A1 * | 8/2001 | Sherwin | ................. | F16M 11/26 396/428 |

* cited by examiner

*Primary Examiner* — Clayton E LaBalle
*Assistant Examiner* — Warren K Fenwick
(74) *Attorney, Agent, or Firm* — Adams Grumbles, LLP; Brittany Nanzig (57) ABSTRACT

A camera tripod for preventing camera movement and providing stability. More specifically, a camera tripod comprising an adjustable center column; three adjustable legs having a plurality of shaft segments, the legs being in concentric thirds around the center column when in a closed position; a camera attachment platform; and a soft lock mechanism on each shaft segment. The camera tripod can be efficiently set up and taken down and greatly improves portability and ease of use.

18 Claims, 11 Drawing Sheets

CAMERA TRIPOD

CROSS-REFERENCE TO RELATED APPLICATION

This application claims the benefit of U.S. Provisional Patent Application No. 62/005,344, filed on May 30, 2014, titled CAMERA TRIPOD.

FIELD OF THE DISCLOSURE

The disclosed invention relates to a stand with a plurality of legs that supports an article. More specifically, the disclosed invention relates to a tripod stand having three legs that are in concentric thirds around a center column and a surface to attach and support a camera.

BACKGROUND OF THE INVENTION

Traditional tripods are bulky and have a large effective volume because of the amount of negative space between the legs of the tripod. Further, the knobs and locking mechanisms that exist on the outside of the legs on traditional tripods contribute to the overall bulk of the units.

Traditional tripods also can be tricky and time-consuming to set up and take down. This is because each leg has three or four joints that all need to be unlocked and re-locked each time the tripod is set up for use. The process then needs to be repeated when the tripod is taken down.

A tripod with a compact package that can be efficiently set up and taken down will greatly improve portability and ease of use.

SUMMARY OF THE INVENTION

The present disclosure relates to a tripod having three legs that are in concentric thirds around a center column and a surface to attach and support a camera. More specifically, each of the three legs of the tripod is comprised of several, differently sized, nesting shaft segments and each shaft segment is, therefore, able to easily slide in and out of the next larger shaft segment to create a condensed cylinder that is easy to store and transport. The shaft segments are able to lock in place when extended or condensed by using a soft lock mechanism at the top and bottom of each shaft segment.

DETAILED DESCRIPTION

The present disclosure relates to a tripod that is used as a platform to support a camera. Various embodiments of the tripod will be described in detail with reference to the drawings, wherein like reference numerals represent like parts and assemblies throughout the several views. Reference to various embodiments does not limit the scope of the tripod disclosed herein. Additionally, any examples set forth in this specification are not intended to be limiting and merely set forth some of the many possible embodiments for the tripod. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

In general terms, the present disclosure relates to a camera tripod used for preventing camera movement and providing stability. Various embodiments of the camera tripod can include a number of components including, but not limited to, three legs, a center column, and a camera attachment platform.

Each leg can be comprised of a one or a plurality of shaft segments and can be used to support the center column and the camera attachment platform. For example, each leg may contain four shaft segments. If a leg is comprised of a plurality of shaft segments, the shaft segments can act as nesting elements. For example, the bottom shaft segment can fit into a second shaft segment above it, the second shaft segment can fit into a third shaft segment above it, and so on until all of the shaft segments are nested into the uppermost shaft segment.

The center column can be used to extend the height of the unit without increasing the volume when the unit is in its closed position. For example, to move the unit into a completely closed position, the center column can be pushed down into a condensed position, wherein the center column is located within a hollow cylinder created by the legs. The legs can create this hollow cylinder when they are pulled in against each other because they are concentric thirds. To extend the height, the center column can be slid out of the hollow cylinder and locked in an open position. In one embodiment, the base of the center column may be wider than the main shaft of the center column, which can prevent the center column from sliding out the top of the hollow cylinder created by the legs.

In some embodiments, each leg may have a foot, which can protect the bottom of the legs when they are in use. They can also protect the bottom of the center column when the tripod is in its closed position. Further, the feet can also act as a stopper, wherein they can prevent the center column from sliding out of the bottom of the tripod when it is in its closed position. For example, the feet may consist of concentric thirds that create a hollow cylinder, but, unlike the legs, the feet may create a hollow cylinder that has a smaller circumference than the legs and the center column.

The camera attachment platform can be used to attach a variety of camera types to the tripod. It can have a mounting screw, such as, but not limited to, a ¼ inch mounting screw that can screw into the bottom of a camera. Other ways of attaching the camera to the platform, such as a snap in mechanism, a slide in mechanism, or a simple hook and loop, are also possible.

FIGS. 1-9 illustrate a right side view (FIG. 1) and a left side view (FIG. 3) of one extended leg of a tripod, a front view (FIG. 2) of one extended leg of a tripod, a top view (FIG. 4) of one extended leg of a tripod, a bottom view (FIG. 5) of one extended leg of a tripod, and various stages of one leg when it is going from a closed, or contracted, position (FIG. 9) to a completely open, or extended, position (FIG. 6) or vice versa.

Figure 1:
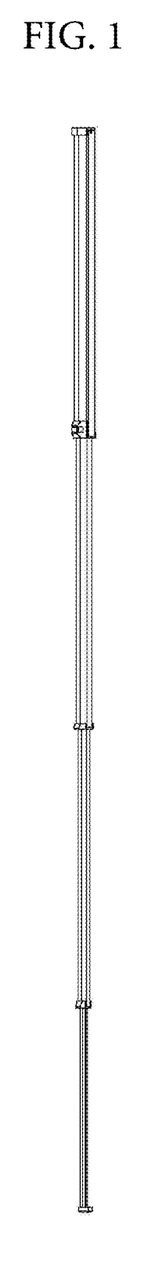
FIG. 1 is a right side view of one leg according to one embodiment of the disclosed device.
Figure 2:
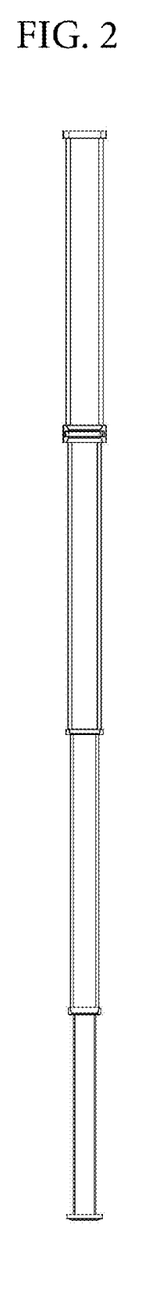
FIG. 2 is a front view of one leg according to one embodiment of the disclosed device.
Figure 3:
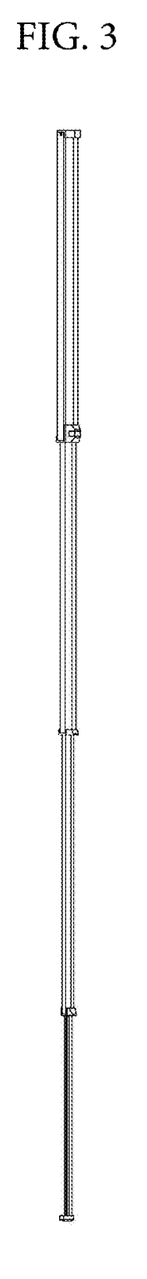
FIG. 3 is a left side view of one leg according to one embodiment of the disclosed device.
Figure 4:
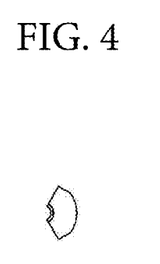
FIG. 4 is a top view of one leg according to one embodiment of the disclosed device.
Figure 5:
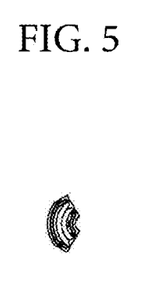
FIG. 5 is a bottom view of one leg according to one embodiment of the disclosed device.
Figure 6:
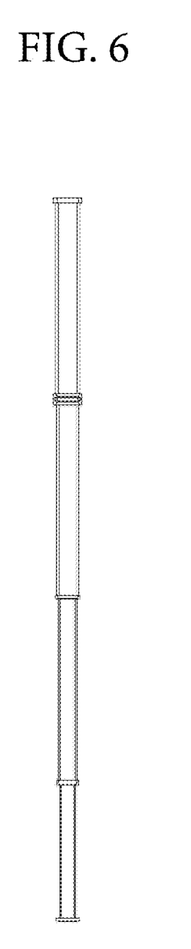
FIG. 6 is a front view of an extended leg according to one embodiment of the disclosed device.
Figure 7:
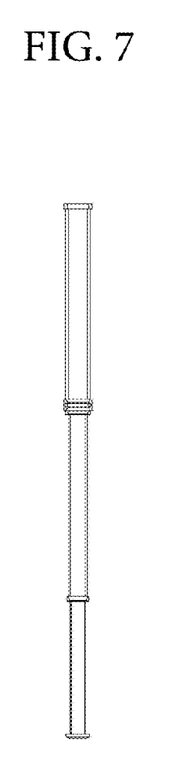
FIG. 7 is a front view of a partially closed leg according to one embodiment of the disclosed device.
Figure 8:
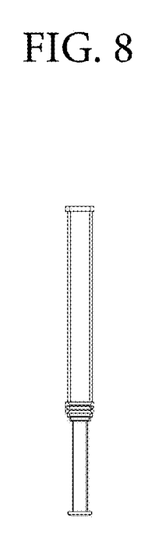
FIG. 8 is a front view of a partially closed leg according to one embodiment of the disclosed device.
Figure 9:
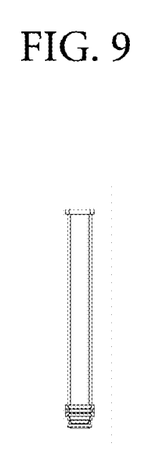
FIG. 9 is a front view of a closed leg according to one embodiment of the disclosed device.
Figure 10:
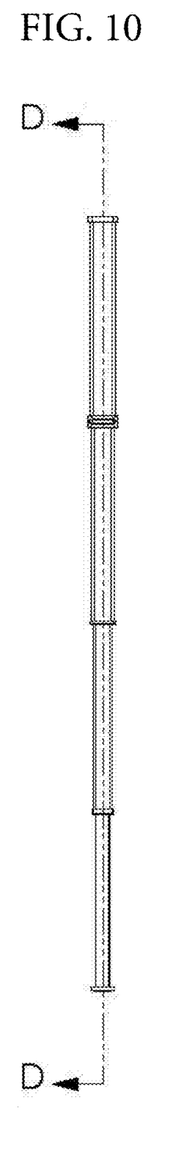
FIG. 10 is a front view of one leg according to one embodiment of the disclosed device
Figure 11:
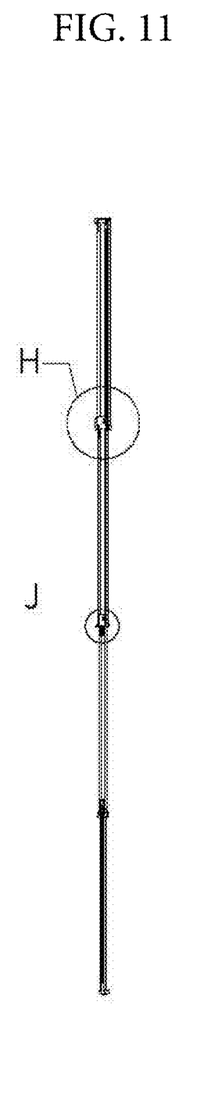
FIG. 11 is cross-sectional, right side view of the leg of FIG. 10 according to one embodiment of the disclosed device.
Figure 11H:
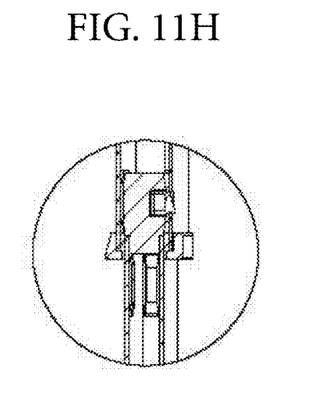
FIG. 11H is a cross-sectional, right side, magnified view of the locking mechanism of the leg of FIG. 10 according to one embodiment of the disclosed device.
Figure 11J:
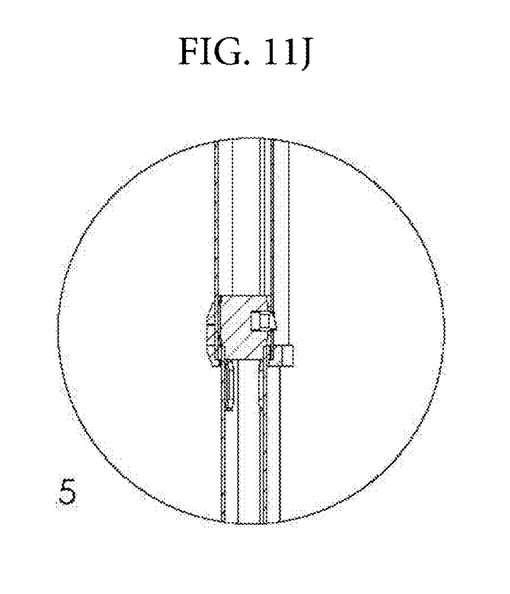
FIG. 11J is a cross-sectional, right side, magnified view of the locking mechanism of the leg of FIG. 10 according to one embodiment of the disclosed device.
Figure 12:
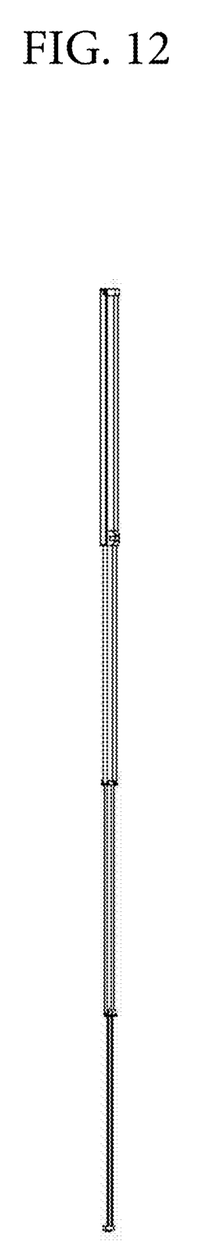
FIG. 12 is a left side view of one leg according to one embodiment of the disclosed device.
Figure 13:
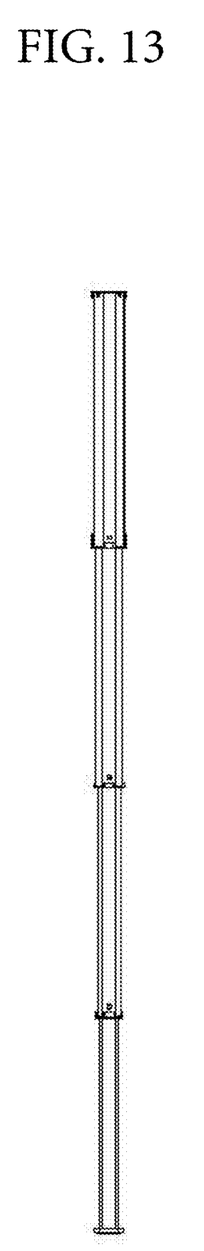
FIG. 13 is a back view of one leg according to one embodiment of the disclosed device.
Figure 14:
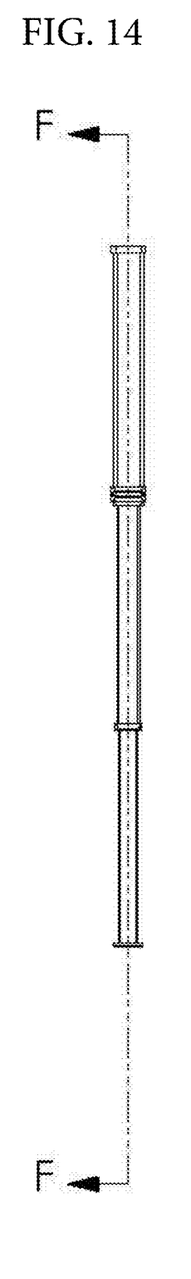
FIG. 14 is a front view of a partially closed leg according to one embodiment of the disclosed device.
Figure 15:
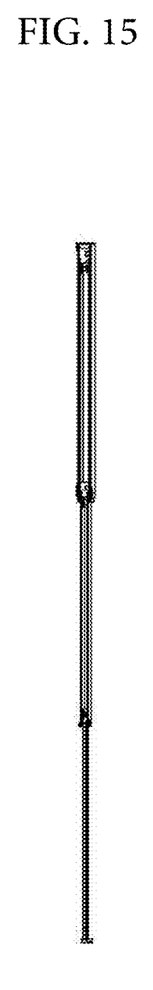
FIG. 15 is a cross-sectional, right side view of the partially closed leg of FIG. 14 according to one embodiment of the disclosed device.
Figure 16:
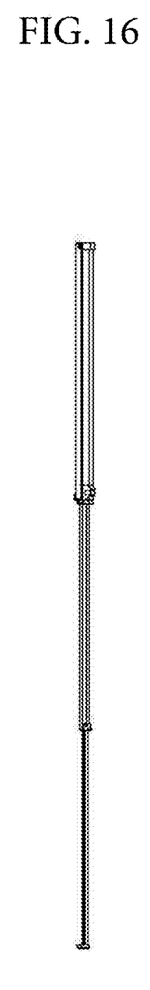
FIG. 16 is a left side view of the partially closed leg of FIG. 14 according to one embodiment of the disclosed device.
Figure 17:
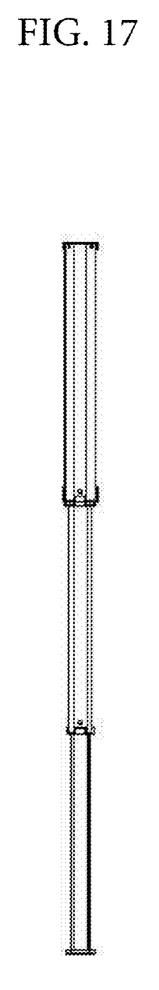
FIG. 17 is a back view of the partially closed leg of FIG. 14 according to one embodiment of the disclosed device.
Figure 18:
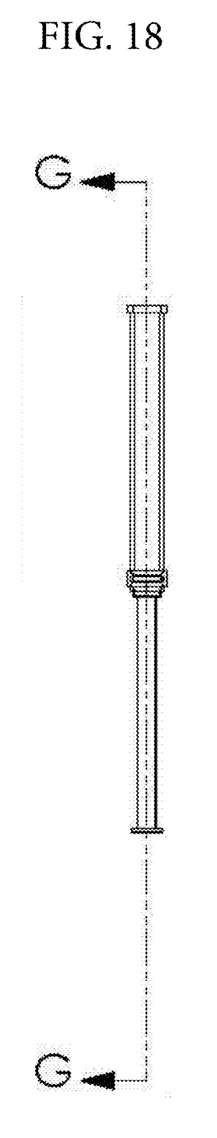
FIG. 18 is a front view of a partially closed leg according to one embodiment of the disclosed device.
Figure 19:
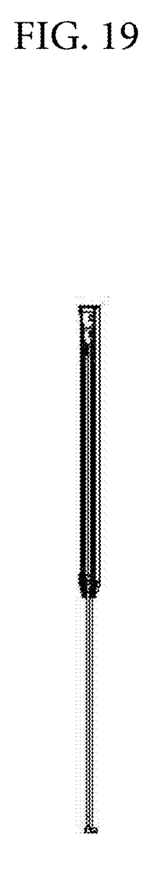
FIG. 19 is a cross-sectional, right side view of the partially closed leg of FIG. 18 according to one embodiment of the disclosed device.
Figure 20:
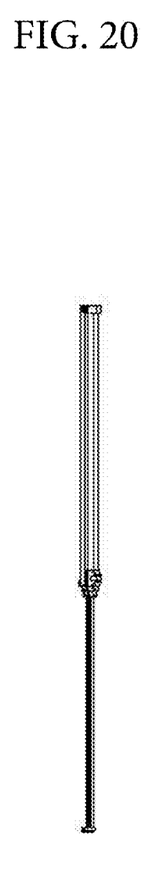
FIG. 20 is a left side view of the partially closed leg of FIG. 18 according to one embodiment of the disclosed device.
Figure 21:
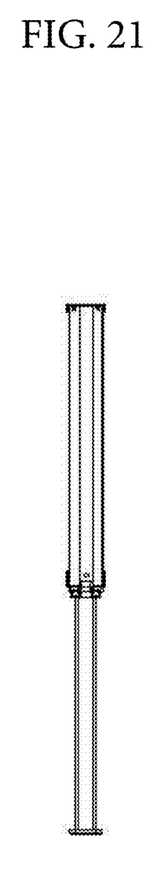
FIG. 21 is a back view of the partially closed leg of FIG. 18 according to one embodiment of the disclosed device.
Figure 22:
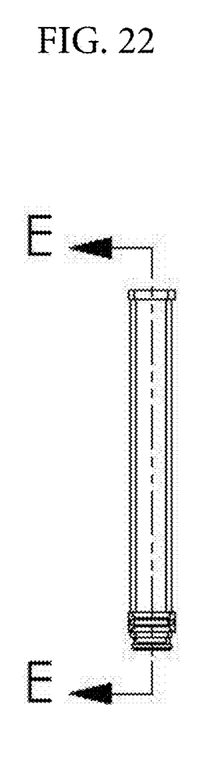
FIG. 22 is a front view of a closed leg according to one embodiment of the disclosed device.
Figure 23:
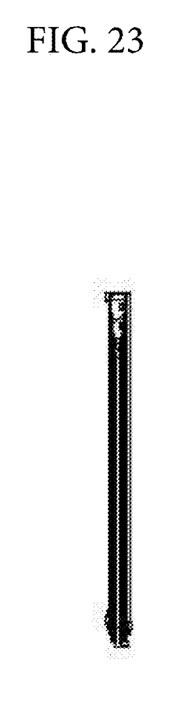
FIG. 23 is a cross-sectional, right side view of the closed leg of FIG. 22 according to one embodiment of the disclosed device.
Figure 24:
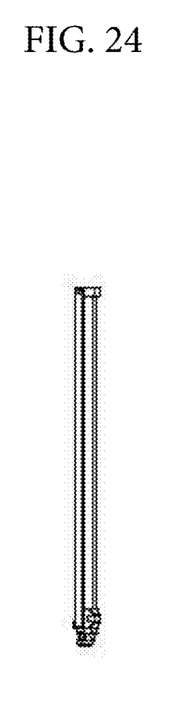
FIG. 24 is a left side view of the closed leg of FIG. 22 according to one embodiment of the disclosed device.
Figure 25:
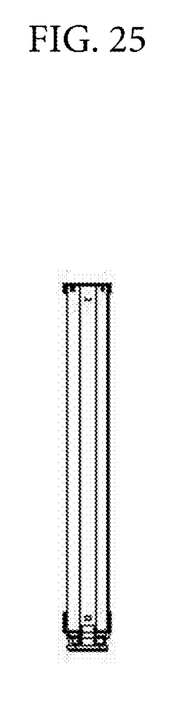
FIG. 25 is a back view of the closed leg of FIG. 22 according to one embodiment of the disclosed device.

FIGS. 10-25 illustrate side, front, and back views of one leg of the camera tripod in various stages of the leg when it is going from an open, or extended, position to a closed, or contracted, position or vice versa. FIGS. 11H and 11J illustrate, in more detail, the locking mechanism at two joints of one leg of the camera tripod.

Figure 26:
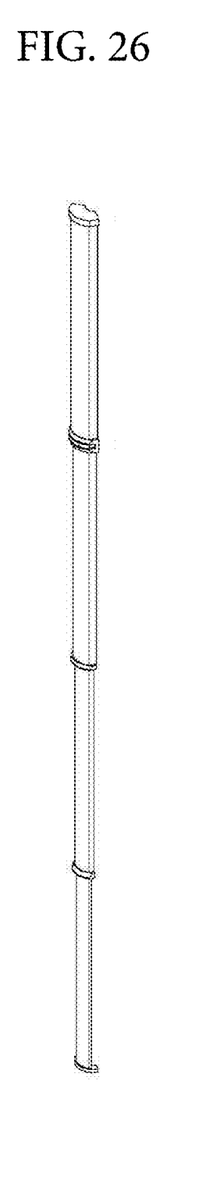
FIG. 26 is a perspective right side view of an extended leg according to one embodiment of the disclosed device.
Figure 27:
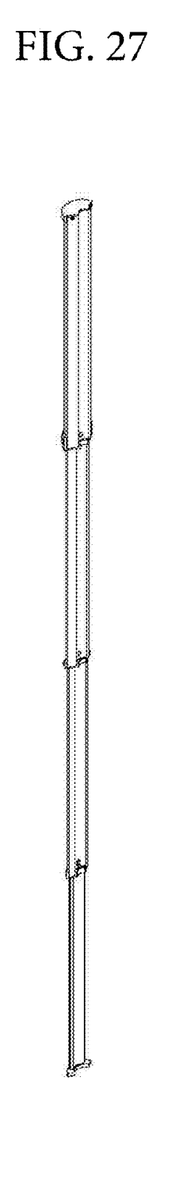
FIG. 27 is a perspective back view of an extended leg according to one embodiment of the disclosed device.
Figure 28:
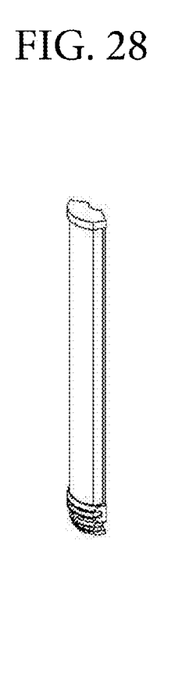
FIG. 28 is a perspective right side view of a closed leg according to one embodiment of the disclosed device.
Figure 29:
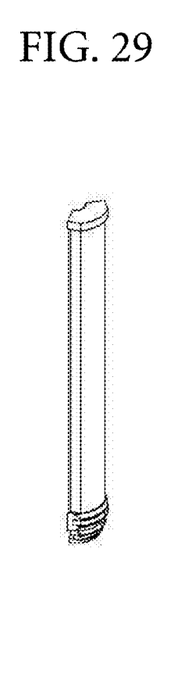
FIG. 29 is a perspective left side view of a closed leg according to one embodiment of the disclosed device.
Figure 30:
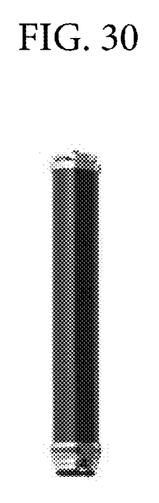
FIG. 30 is a front view of a closed leg according to one embodiment of the disclosed device.
Figure 31:
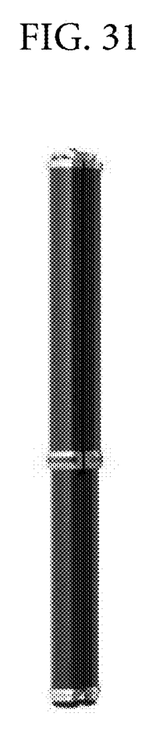
FIG. 31 is a front view of a partially closed leg according to one embodiment of the disclosed device.
Figure 32:
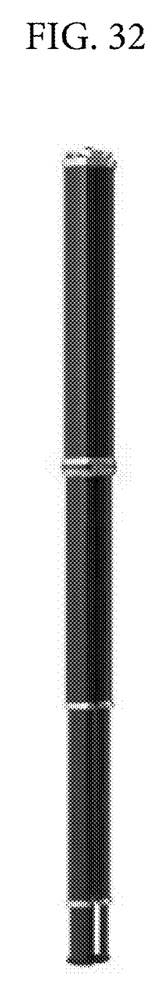
FIG. 32 is a front view of a partially closed leg according to one embodiment of the disclosed device.
Figure 33:
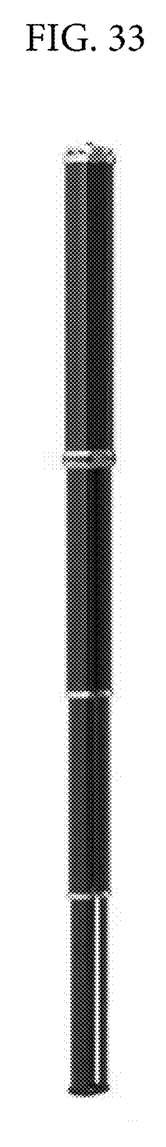
FIG. 33 is a front view of an extended leg according to one embodiment of the disclosed device.
Figure 34:
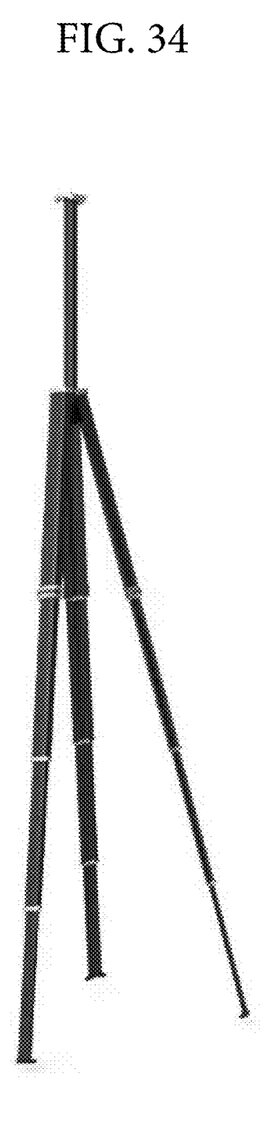
FIG. 34 illustrates one example of the complete device.
Figure 35:
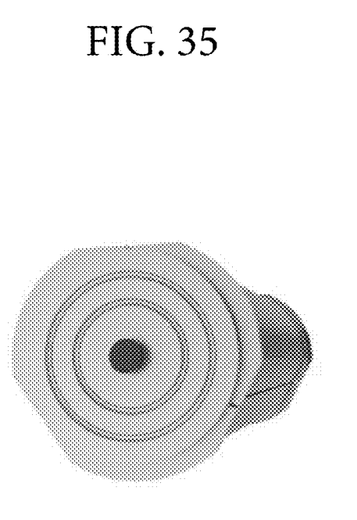
FIG. 35 is a top view of one embodiment of the complete device.

FIGS. 26 and 27 illustrate two views of one leg in the completely extended position. FIGS. 28 and 29 illustrate two views of one leg in the completely contracted position. FIGS. 30-33 illustrate front views of the device with all three legs, wherein the legs are in various stages of opening and closing. FIG. 30 illustrates the device in the completely closed position. FIGS. 31 and 32 illustrates the device in various stages of extension. FIG. 33 illustrates the device when the legs are completely extended, but wherein the legs have not been separated and the column has not been extended. FIG. 34 illustrates a side view of the camera tripod when the legs are in an open, or extended, position and are spread out, and the center column is fully extended. FIG. 35 illustrates a top perspective view of the camera tripod in a completely closed, or contracted, position.

When the tripod is in a completely closed position, the center column and each of the legs is contracted so that the tripod forms the shape of a small cylinder and is easily carried in one hand. Each leg makes up a concentric third around a center column, as shown in FIG. 34, so that, in the closed position, as shown in FIGS. 30 and 35, the legs line up next to each other, and around the center column, without sacrificing empty space.

When the tripod is in a completely open position, as illustrated in FIG. 34, the column is fully extended upward and its three legs are fully extended downward and outward. FIGS. 1-33 also illustrate the legs of the tripod in various open and closed positions. As illustrated in FIGS. 26-29, and 34, each tripod leg is one third of a hollow cylinder with the space in the center of the cylinder, when the legs are closed and contracted, being big enough to accommodate the center column when it recedes into the cylinder in the closed position.

In some embodiments, the legs can be attached to each other at their uppermost portions while still maintaining the space in the center of the hollow cylinder. The attachment can include a hinge for each leg in order to provide a user with the ability to position each leg independently.

In one embodiment, to fully contract the legs so that the tripod is in a closed position, each leg is initially moved inward toward the center column after the center column is pushed down into its closed position. Once the legs are lined up next to each other, they activate an automatic release button. With the automatic release button activated, the legs can be contracted together by applying pressure on the top or bottom. In another embodiment, the legs can be moved inward toward the center and/or contracted together before the center column is pushed down into its closed position.

Figure 36:
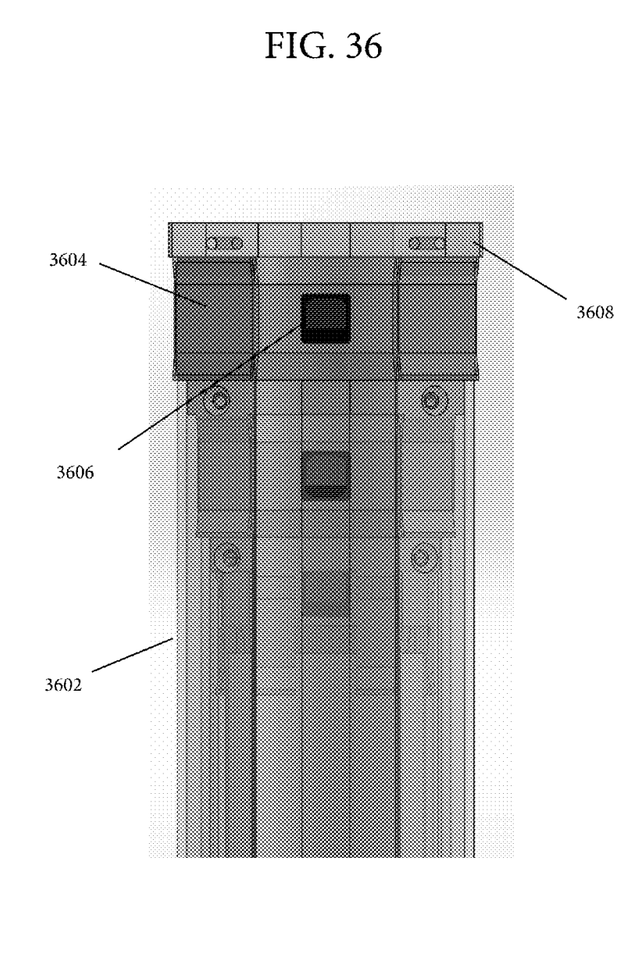
FIG. 36 illustrates, from the inside, the locking mechanism at the top of the disclosed invention.
Figure 37:
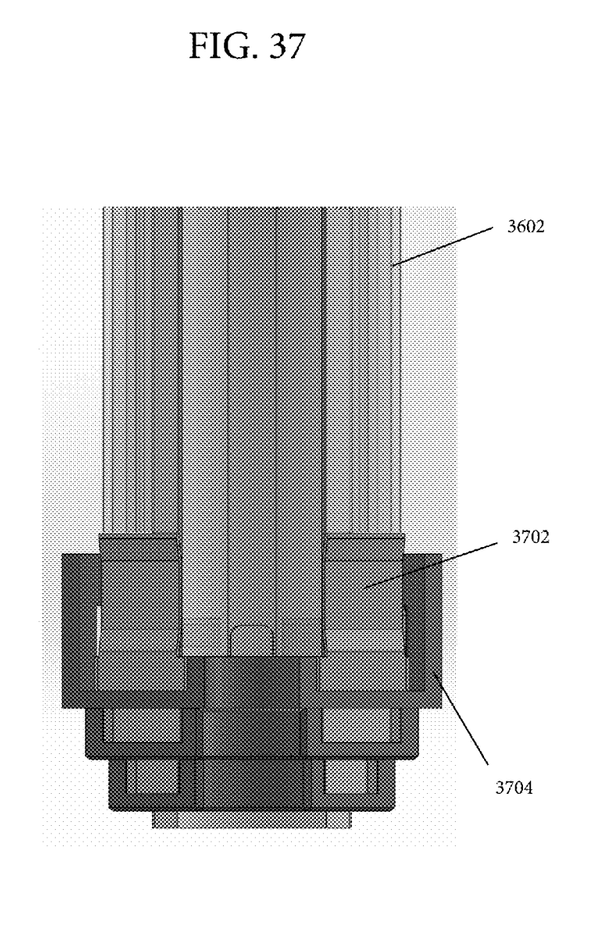
FIG. 37 illustrates, from the inside, the locking mechanism at the bottom of the disclosed invention.

As illustrated in FIGS. 36 and 37, once the legs are contracted and the center column is pushed down into its closed position, the pieces can be locked in place using a soft lock mechanism at the top and bottom of each shaft segment 3602 of each leg so that the legs do not inadvertently open. This process is described using the top two shaft segments as an example. Fixed into the top of the uppermost shaft segment, there is a friction leaf spring insert 3604. The bottom of the friction leaf spring insert 3604 has a plastic spring mechanism that penetrates slightly into the interior of the shaft segment, facing the outside of the second shaft segment, which is below the uppermost shaft segment. The second shaft segment also has a leaf spring insert 3604 at the top of the shaft segment, wherein the bottom of the second shaft segment's leaf spring insert 3604 also has plastic springs that penetrate slightly into the interior of the second shaft segment, facing the outside of the third shaft segment, which is below the second shaft segment. The top of the second shaft segment's friction leaf spring insert 3604 is a wedge that interfaces with the uppermost shaft segment's friction leaf spring insert 3604. As the second shaft segment's wedge is pushed into the uppermost shaft segment's spring, the second shaft segment is, in effect, gripped by the spring and held in place so that the top friction leaf spring insert 3604 in the uppermost shaft segment and the top friction leaf spring insert 3604 in the second shaft segment are interacting with each other. This same mechanism takes place at the bottom of each shaft segment of each leg so that, for example, the bottom friction leaf spring insert 3702 of the uppermost shaft segment, located in a shaft collar 3704, and the bottom friction leaf spring insert 3702 of the second shaft segment interact with each other.

In one embodiment, to open the tripod from its closed position, the center column and each leg can be fully extended and locked in one fluid motion. The position and spread of the legs are capable of being adjusted once they are in a fully extended and locked position. This allows a user to adjust the tripod on any type of surface, whether it is even or uneven. The locking system described above for the closed position also functions when the tripod is in the open position, but, for example, with the bottom friction leaf spring insert 3702 of the uppermost shaft segment interacting with the top friction leaf spring insert 3604 of the second shaft segment, the bottom friction leaf spring insert 3702 of the second shaft segment interacting with the top friction leaf spring insert 3604 of the third insert, and so on. Additionally, as illustrated in FIG. 37, to ensure the legs do not inadvertently contract, there is a hard lock mechanism (for example, a spring detent button 3606) that snaps into place and prevents the shaft segments from sliding in to each other. In some cases, the second shaft segment can slide partially into the uppermost shaft segment and be held in place using an over center cam located near the bottom of the uppermost shaft segment.

In one embodiment, to activate the release button and close the tripod, the center column must be pushed down into its closed position. For example, the closed position may be defined as the point in time when a cap 3608 on the top of the center column approaches or interacts with the top of the uppermost shaft segment. In another embodiment, the release button can be activated regardless of the open or closed position of the center column.

In one embodiment, the tripod has additional features that allow it to be securely fixed to a carrying device. In another embodiment, the tripod has additional features that allow a camera strap to be secured to the tripod.

What is claimed is:

1. A camera tripod for preventing camera movement and providing stability, the camera tripod comprising:
    an adjustable center column capable of sliding into an extended position and a condensed position;
    three adjustable legs, each adjustable leg having a plurality of shaft segments, wherein each of the plurality of shaft segments has a top and a bottom and at least one of the plurality of shaft segments is capable of fitting inside an immediately adjacent shaft segment;
    a camera attachment platform;
    a soft lock mechanism located at the top and the bottom of each of the plurality of shaft segments;
    a hard lock mechanism located at the bottom of each of the plurality of shaft segments; and
    an automatic release button;
    wherein:
        each of the three adjustable legs has a hinge at the top of an uppermost segment that enables each adjustable leg to rotate around the hinge toward and away from the other adjustable legs; and
        the three adjustable legs activate the automatic release button when they are rotated completely inward toward each other.

2. The camera tripod of claim 1, wherein the automatic release button disables the hard lock mechanism.

3. The camera tripod of claim 1, wherein the automatic release button disables the soft lock mechanism.

4. The camera tripod of claim 1, wherein the adjustable center column has a locking mechanism that enables it to lock in the extended position.

5. The camera tripod of claim 4, wherein the automatic release button disables the adjustable center column's locking mechanism.

6. The camera tripod of claim 1, wherein:
    each adjustable leg is capable of being in an extended position, wherein the top of a first shaft segment aligns near the bottom of a second shaft segment, and
    each adjustable leg is capable of being in a condensed position, wherein the top of the first shaft segment aligns near the top of the second shaft segment.

7. The camera tripod of claim 6, wherein the hard lock mechanism enables each adjustable leg to lock when in the extended position.

8. The camera tripod of claim 6, wherein the soft lock mechanism enables each adjustable leg to lock in the extended position.

9. The camera tripod of claim 6, wherein the soft lock mechanism enables each adjustable leg to lock in its condensed position.

10. The camera tripod of claim 6, wherein, in its condensed position, the three adjustable legs lock in concentric thirds around the center column.

11. The camera tripod of claim 10, wherein each of the three adjustable legs line up next to each other and the center column in immediately adjoining positions without intervening space when the three adjustable legs and the center column are in their condensed positions.

12. The camera tripod of claim 1, wherein the three adjustable legs create a hollow cylinder when they are rotated completely inward toward each other.

13. A camera tripod for preventing camera movement and providing stability, the camera tripod comprising:
    an adjustable center column capable of sliding into an extended position and a condensed position;
    three adjustable legs, each adjustable leg having a plurality of shaft segments, wherein each of the plurality of shaft segments has a top and a bottom and at least one of the plurality of shaft segments is capable of fitting inside an immediately adjacent shaft segment;
    a camera attachment platform;
    a soft lock mechanism located at the top and the bottom of each of the plurality of shaft segments;
    a hard lock mechanism located at the bottom of each of the plurality of shaft segments; and
    an automatic release button;
    wherein:
        each of the three adjustable legs has a hinge at the top of an uppermost segment;
        each of the three adjustable legs rotates around the hinge into an extended position when the three adjustable leg is moved away from the other adjustable legs;

each of the three adjustable legs rotates around the hinge into a condensed position when each adjustable leg is moved toward the other adjustable legs;

the three adjustable legs are concentric thirds; and in their condensed positions, the three adjustable legs line up next to each other in immediately adjoining positions without intervening space.

14. The camera tripod of claim 13, wherein the three adjustable legs create a hollow space in their condensed positions.

15. The camera tripod of claim 14, wherein the hollow space is in the shape of a cylinder.

16. The camera tripod of claim 15, wherein the camera attachment platform fits into the hollow cylinder.

17. The camera tripod of claim 16, wherein the three adjustable legs are in immediately adjoining positions to the center column without intervening space when the three adjustable legs and the center column are in their condensed positions.

18. The camera tripod of claim 13, wherein the three adjustable legs activate the automatic release button when they are rotated completely inward toward each other.

* * * * *